United States Patent
Shi

(10) Patent No.: US 8,624,440 B2
(45) Date of Patent: Jan. 7, 2014

(54) POWER MANAGEMENT CIRCUIT AND ELECTRONIC DEVICE

(75) Inventor: Yong-Song Shi, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 905 days.

(21) Appl. No.: 12/769,678

(22) Filed: Apr. 29, 2010

(65) Prior Publication Data

US 2010/0301828 A1    Dec. 2, 2010

(30) Foreign Application Priority Data

Jun. 2, 2009  (CN) .......................... 2009 1 0302843

(51) Int. Cl.
*H01H 47/00* (2006.01)
*H01H 83/00* (2006.01)
*H02J 7/00* (2006.01)
*G05F 5/00* (2006.01)

(52) U.S. Cl.
USPC .......................................... 307/125; 323/299

(58) Field of Classification Search
None
See application file for complete search history.

(56) References Cited

U.S. PATENT DOCUMENTS

| 4,935,316 A | 6/1990 | Redey |
| 7,629,769 B2 * | 12/2009 | Gangstoe et al. ............. 320/134 |
| 2007/0108941 A1 * | 5/2007 | Sainomoto et al. ........... 320/112 |

FOREIGN PATENT DOCUMENTS

| CN | 2150658 Y | 12/1993 |
| CN | 1667912 A | 9/2005 |
| CN | 1967966 | 5/2007 |
| TW | 200818656 | 4/2008 |

\* cited by examiner

*Primary Examiner* — Jared Fureman
*Assistant Examiner* — Aqeel Bukhari
(74) *Attorney, Agent, or Firm* — Altis Law Group, Inc.

(57) ABSTRACT

The power management circuit includes a sampling unit, a reference voltage unit, a comparator, and a power managing unit. The sampling unit divides an input voltage from the power supply to generate a sampling voltage. The reference voltage unit receives the input voltage and generates a reference voltage when the input voltage is larger than a predetermined value. The comparator compares the sampling voltage with the reference voltage, generates a first signal when the sampling voltage is larger than the reference voltage, and generates a second signal when the sampling voltage is smaller than the reference voltage. The power managing unit establishes an electrical connection between the power supply and the load according to the first signal, and cuts off the electrical connection between the power supply and the load according to the second signal. A related electronic device is also provided.

13 Claims, 2 Drawing Sheets

POWER MANAGEMENT CIRCUIT AND ELECTRONIC DEVICE

BACKGROUND

1. Technical Field

The disclosed embodiments relate to power management circuits, and more particularly to a power management circuit and an electronic device.

2. Description of Related Art

Generally, a power management circuit is used in various electronic devices. The power management circuit is coupled between a power supply, for example a rechargeable battery, and a load. The power management circuit includes a detecting unit and a power managing unit. The detecting unit is used for detecting an input voltage from the power supply and generating a detecting voltage. The power managing unit compares the detecting voltage with a first standard voltage and a second standard voltage. When the power managing unit determines that the detecting voltage is larger than the first standard voltage, the power supply can provide the input voltage to the load through the power managing unit. When the power managing unit determines that the detecting voltage is smaller than the second standard voltage, the power supply stops providing the input voltage to the load through the power managing unit.

However, because the input voltage from the power supply decreases, the detecting voltage may be smaller than the first standard voltage and larger than the second standard voltage, therefore the power managing unit is inefficient.

What is needed, therefore, is a power management circuit and an electronic device to overcome the above described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
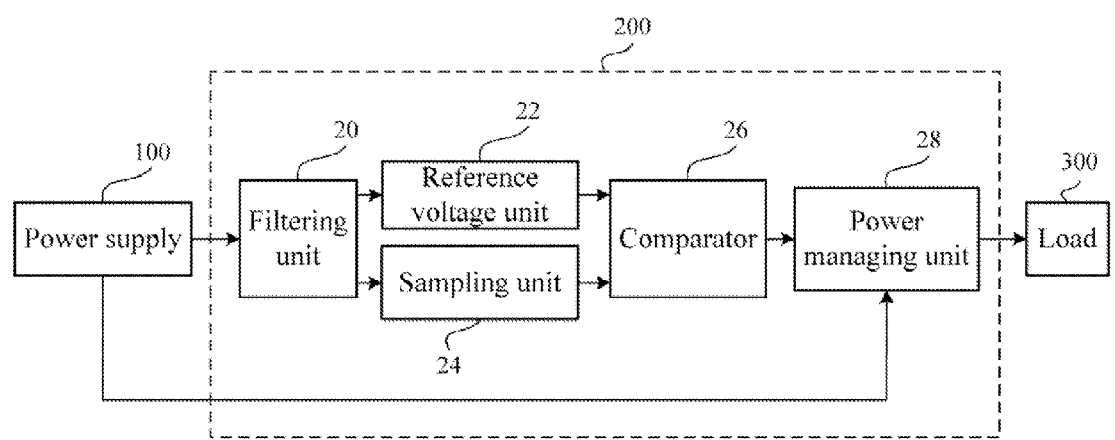
FIG. 1 is a block diagram of a power management circuit in accordance with an exemplary embodiment.

Referring to FIG. 1, a power management circuit 200 in accordance with an exemplary embodiment is illustrated. The power management circuit 200 is coupled between a power supply 100 and a load 300. The power management circuit 100 includes a filtering unit 20, a reference voltage unit 22, a sampling unit 24, a comparator 26, and a power managing unit 28.

The filtering unit 20 is used for filtering an input voltage from the power supply 100, and providing the filtered input voltage to the reference voltage unit 22 and the sampling unit 24.

The reference voltage unit 22 is used for receiving the filtered input voltage and generating a reference voltage when the filtered input voltage is larger than a predetermined value.

The sampling unit 24 is used for sampling the filtered input voltage to generate a sampling voltage.

The comparator 26 is used for comparing the sampling voltage with the reference voltage. When the sampling voltage is larger than the reference voltage, the comparator 26 may generate a first signal. When the sampling voltage is smaller than the reference voltage, the comparator 26 may generate a second signal. In the embodiment, the first signal may be a high level signal, the second signal may be a low level signal.

The power managing unit 28 is coupled between the power supply 100 and the load 300 and is used for establishing an electrical connection between the power supply 100 and the load 300 according to the first signal, thus the power supply 100 provides the input voltage to the load 300. The power managing unit 28 is also used for cutting off the electrical connection between the power supply 100 and the load 300 according to the second signal, thus the power supply 100 stop providing the input voltage to the load 300. When the input voltage from the power supply 100 decreases, the power managing unit 28 only receives one of the first signal and the second signal from the comparator 26, therefore the power managing unit 28 can work efficiently.

Figure 2:
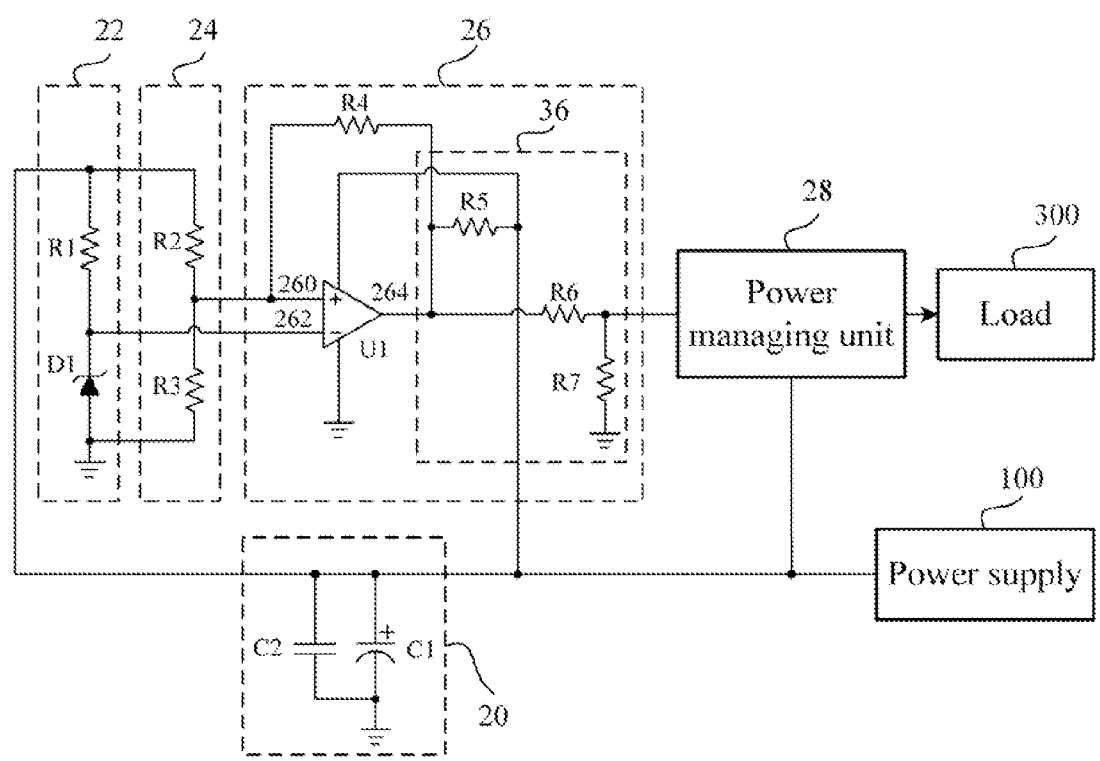
FIG. 2 is a circuit diagram of the power management circuit of FIG. 1 in accordance with the exemplary embodiment.

Referring to FIG. 2, the filtering unit 20 includes a first capacitor C1 and a second capacitor C2. The first capacitor C1 and the second capacitor C2 are coupled in parallel between the power supply 100 and ground.

The reference voltage unit 22 includes a first resistor R1 and a zener diode D1. One end of the first resistor R1 is coupled to the power supply 100, the other end of the first resistor R1 is coupled to a cathode of the zener diode D1, an anode of the zener diode D1 is grounded.

The sampling unit 24 includes a second resistor R2 and a third resistor R3. The second resistor R2 and the third resistor R3 are coupled in series between the power supply 100 and ground. The second resistor R2 and the third resistor R3 are used for dividing the input voltage from the power supply 100 to generate the sampling voltage.

The comparator 26 includes an operational amplifier U1, a fourth resistor R4, and a generator 36. The generator 36 includes a fifth resistor R5, a sixth resistor R6, and a seventh resistor R7. The operational amplifier U1 includes a non-inverting input terminal 260, an inverting input terminal 262, and an output terminal 264. The non-inverting input terminal 260 is coupled between the second resistor R2 and the third resistor R3. The inverting input terminal 262 is coupled between the first resistor R1 and the cathode of the zener diode D1. The fourth resistor R4 is coupled between the non-inverting input terminal 260 and the output terminal 264. The fifth resistor R5 is coupled between the power supply 100 and the output terminal 264. The sixth resistor R6 is coupled between the output terminal 264 and the power managing unit 28. One end of the seventh resistor R7 is coupled to the power managing unit 28, the other end of the seventh resistor R7 is grounded.

The principal of the power management circuit 200 is described as follows. The operational amplifier U1 compares the sampling voltage from the sampling unit 24 with the reference voltage from the reference voltage unit 22. When the sampling voltage is larger than the reference voltage, the operational amplifier U1 generates a first level voltage. When the sampling voltage is smaller than the reference voltage, the operational amplifier U1 generates a second level voltage. The generator 36 generates the first signal according to the first level voltage and the input voltage, and generates the second signal according to the second level voltage and the input voltage. In this embodiment, the first level voltage is a high level voltage, the second level voltage is a low level voltage. In other embodiments, one having ordinary skill in the art can easily adapt corresponding logic circuit to have the first level voltage with low level voltage.

When the operational amplifier U1 outputs a high level voltage, the high level voltage is transmitted to the power managing unit 28 through the resistor R6. Because the output terminal 264 is coupled to the power supply 100 through the resistor R5, the magnitude of the first signal generated by the comparator 26 is larger than a first standard voltage preset in the power managing unit 28. The power managing unit 28 establishes an electrical connection between the power supply 100 and the load 300, the load 300 can receive the input voltage from the power supply 100.

When the operational amplifier U1 outputs a low level voltage, the low level voltage is transmitted to the power managing unit 28 through the resistor R6, therefore the magnitude of the second signal generated by the comparator 26 is smaller than a second standard voltage preset in the power managing unit 28. The power managing unit 28 cuts off the electrical connection between the power supply 100 and the load 300, the load 300 cannot receive the input voltage from the power supply 100. Because the power managing unit 28 only receives a first signal or a second signal from the comparator 26, therefore the power managing unit 28 can work efficiently.

Further of alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. A power management circuit coupled between a power supply and a load, the power management circuit comprising:
   a sampling unit for sampling an input voltage from the power supply to generate a sampling voltage;
   a reference voltage unit for receiving the input voltage and generating a reference voltage when the input voltage is larger than a predetermined value;
   a comparator for comparing the sampling voltage with the reference voltage, generating a first signal when the sampling voltage is larger than the reference voltage, and generating a second signal when the sampling voltage is smaller than the reference voltage; and
   a power managing unit for establishing an electrical connection between the power supply and the load according to the first signal, and cutting off the electrical connection between the power supply and the load according to the second signal;
   wherein the comparator comprising an operational amplifier, a fourth resistor and a fifth resistor, the operational amplifier comprising an inverting input terminal coupled to the reference voltage unit, a non-inverting input terminal coupled to the sampling unit, an output terminal coupled to the power managing unit, the fourth resistor is coupled between the non-inverting input terminal and the output terminal, the fifth resistor is coupled between the output terminal and the power supply.

2. The power management circuit of claim 1, further comprising a filtering unit for filtering the input voltage.

3. The power management circuit of claim 1, wherein the reference voltage unit comprises a first resistor and a zener diode, one end of the first resistor is coupled to the power supply, the other end of the first resistor is coupled to a cathode of the zener diode, an anode of the zener diode is grounded, the cathode of the zener diode is coupled to the comparator.

4. The power management circuit of claim 1, wherein the sampling unit comprises a second resistor and a third resistor, the second resistor and the third resistor are coupled in series between the power supply and ground, the comparator comprises a first terminal coupled between the second resistor and the third resistor.

5. The power management circuit of claim 1, wherein the comparator further comprises a sixth resistor and a seventh resistor, the sixth resistor is coupled between the output terminal and the power managing unit, one end of the seventh resistor is coupled to the power managing unit, the other end of the seventh resistor is grounded.

6. A power management circuit coupled between a power supply and a load, the power management circuit comprising:
   a sampling unit for sampling an input voltage from the power supply to generate a sampling voltage;
   a reference voltage unit for receiving the input voltage and generating a reference voltage when the input voltage is larger than a predetermined value;
   a power managing unit for establishing an electrical connection between the power supply and the load according to a first signal, and cutting off the electrical connection between the power supply and the load according to a second signal; and
   a comparator comprising an operational amplifier and a generator, the operational amplifier comprising an inverting input terminal coupled to the reference voltage unit, a non-inverting input terminal coupled to sampling unit, and an output terminal coupled to the power managing unit, the operational amplifier used for comparing the sampling voltage with the reference voltage, generating a first level voltage when the sampling voltage is larger than the reference voltage, and generating a second level voltage when the sampling voltage is smaller than the reference voltage, the generator generating the first signal according to the first level voltage and the input voltage, and generating the second signal according to the second level voltage and the input voltage;
   wherein the comparator further comprising a fourth resistor, the generator comprising a fifth resistor, a sixth resistor and a seventh resistor, the fourth resistor is coupled between the non-inverting input terminal and the output terminal, the fifth resistor is coupled between the output terminal and the power supply, the sixth resistor is coupled between the output terminal and the power managing unit, one end of the seventh resistor is coupled to the power managing unit, the other end of the seventh resistor is grounded.

7. The power management circuit of claim 6, wherein the reference voltage unit comprises a first resistor and a zener diode, one end of the first resistor is coupled to the power supply, the other end of the first resistor is coupled to a cathode of the zener diode, an anode of the zener diode is grounded, the cathode of the zener diode is coupled to the comparator.

8. The power management circuit of claim 6, wherein the sampling unit comprises a second resistor and a third resistor, the second resistor and the third resistor are coupled in series between the power supply and ground, the comparator comprises a first terminal coupled between the second resistor and the third resistor.

9. An electronic device comprising a power supply, a power management circuit, and a load, the power management circuit coupled between the power supply and the load, the power management circuit comprising:
   a sampling unit for sampling an input voltage from the power supply to generate a sampling voltage;

a reference voltage unit for receiving the input voltage and generating a reference voltage when the input voltage is larger than a predetermined value;

a comparator for comparing the sampling voltage with the reference voltage, generating a first signal when the sampling voltage is larger than the reference voltage, and generating a second signal when the sampling voltage is smaller than the reference voltage; and a power managing unit for establishing an electrical connection between the power supply and the load according to the first signal, and cutting off the electrical connection between the power supply and the load according to the second signal;

wherein the comparator comprising an operational amplifier, a fourth resistor and a fifth resistor, the operational amplifier comprising an inverting input terminal coupled to the reference voltage unit, a non-inverting input terminal coupled to the sampling unit, an output terminal coupled to the power managing unit, the fourth resistor is coupled between the non-inverting input terminal and the output terminal, the fifth resistor is coupled between the output terminal and the power supply.

10. The electronic device of claim 9, further comprising a filtering unit for filtering the input voltage.

11. The electronic device of claim 9, wherein the reference voltage unit comprises a first resistor and a zener diode, one end of the first resistor is coupled to the power supply, the other end of the first resistor is coupled to a cathode of the zener diode, an anode of the zener diode is grounded, the cathode of the zener diode is coupled to the comparator.

12. The electronic device of claim 9, wherein the sampling unit comprises a second resistor and a third resistor, the second resistor and the third resistor are coupled in series between the power supply and ground, the comparator comprises a first terminal coupled between the second resistor and the third resistor.

13. The electronic device of claim 9, wherein the comparator further comprises a sixth resistor and a seventh resistor, the sixth resistor is coupled between the output terminal and the power managing unit, one end of the seventh resistor is coupled to the power managing unit, the other end of the seventh resistor is grounded.

* * * * *